W. A. MORRIS.
HEADER ATTACHMENT FOR HARVESTER THRESHER MACHINES.
APPLICATION FILED NOV. 22, 1919.
1,373,347.
Patented Mar. 29, 1921.
2 SHEETS—SHEET 1.
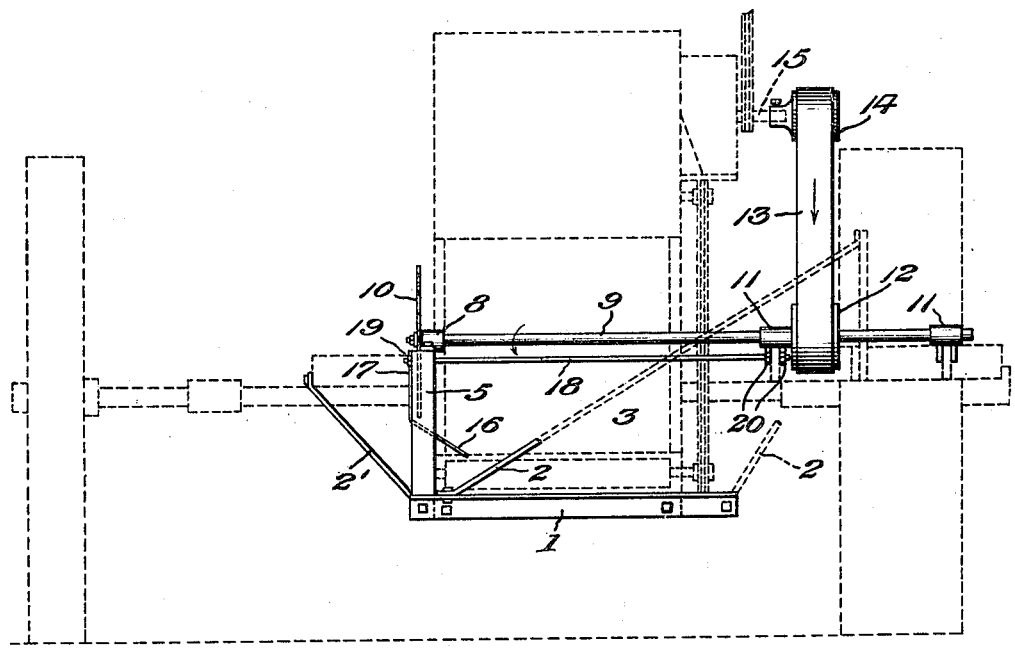

W. A. MORRIS.
HEADER ATTACHMENT FOR HARVESTER THRESHER MACHINES.
APPLICATION FILED NOV. 22, 1919.

1,373,347. Patented Mar. 29, 1921.
2 SHEETS—SHEET 2.

W. A. Morris
Inventor

By Victor J. Evans
Atty.

UNITED STATES PATENT OFFICE.

WILLIAM A. MORRIS, OF MULLINVILLE, KANSAS.

HEADER ATTACHMENT FOR HARVESTER-THRESHER MACHINES.

1,373,347.   Specification of Letters Patent.   Patented Mar. 29, 1921.

Application filed November 22, 1919. Serial No. 339,820.

*To all whom it may concern:*

Be it known that I, WILLIAM A. MORRIS, a citizen of the United States, residing at Mullinville, in the county of Kiowa and State of Kansas, have invented new and useful Improvements in Header Attachments for Harvester-Thresher Machines, of which the following is a specification.

This invention relates to an attachment for harvester threshers and the principal object of the invention is to provide means for cutting off the heads from the sheaves of grain and conveying the heads to the thresher.

Still another object of the invention is to provide means for giving the device a shearing cut with means for adjusting the parts to keep the movable and stationary cutters close together.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a view showing the header of the harvester thresher removed and my attachment in place, the attachment being shown in full lines and parts of the thresher being shown in dotted lines.

Fig. 2 is a partial view.

Figure 3:
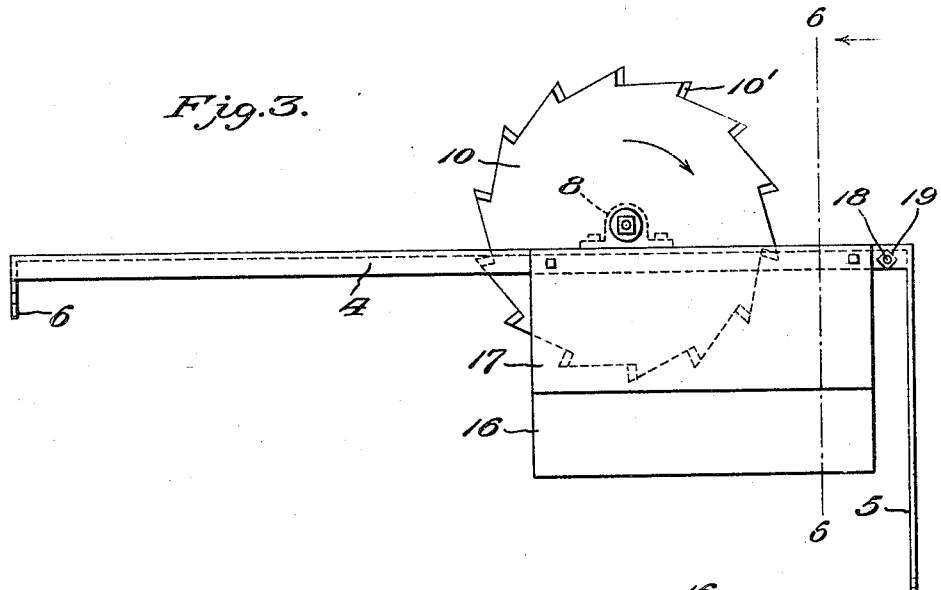
Fig. 3 is a side view of the attachment.
Figure 4:
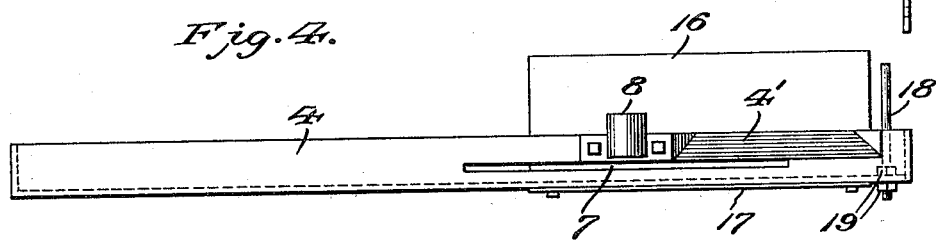
Fig. 4 is a plan view with the cutter removed.
Figure 5:
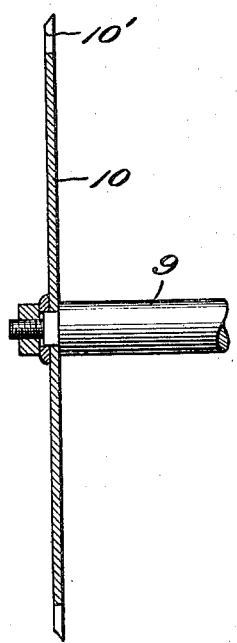
Fig. 5 is a detail view of the cutter.
Figure 6:
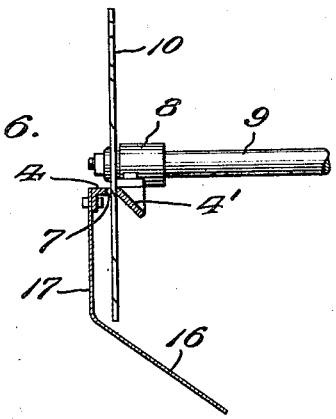
Fig. 6 is a section on line 6—6 of Fig. 3.

In carrying out my invention I remove the header from the machine and replace the long front bar of the header frame by a short bar, indicated at 1. This bar has secured thereto the usual braces 2 which are usually connected with the long bar of the header frame and this bar 1 also supports the front end of the frame which carries the apron 3 which leads to the threshing apparatus. A brace 2' connects one end of the bar 1 with the rear part of the apparatus as shown in Figs. 1 and 2.

A bar 4, preferably made of angle iron, is provided with a downwardly extending leg 5 which has its lower end bolted to the bar 1. An ear 6 is provided at the other end of the bar and this ear is bolted to a part of the thresher apparatus. In this manner the bar 4 is supported in a horizontal position along one side of the apron. This bar is provided with a slot 7 and a bearing 8, secured to the bar adjacent said slot to receive one end of a shaft 9 which carries the circular cutting member 10, said member projecting through the slot as shown. The other end of the shaft is carried by the journals 11 supported by the thresher frame and a pulley 12 is secured to said shaft. A belt 13 passes over this pulley and over pulley 14 which is connected with the shaft 15 which forms a part of the threshing apparatus. In this way when the threshing apparatus is in operation the shaft 9 will be rotated to drive the cutting member 10.

The front part of the bar 4 is provided with an inclined portion 4' for deflecting the heads severed by the cutting member downwardly and a portion of the upper edge of this inclined part forms a wall of the slot 7 and coöperates with the cutting member to cut the material with a shearing cut, the cutting member being provided with the inclined teeth 10', having beveled edges as shown. The cut heads will drop off the inclined part 4' onto the inclined part 16 of the deflector plate 17 which is bolted to the bar 4 and deflects the heads on to the front part of the apron 3.

The means for keeping the cutting member in contact with the upper edge of the inclined part 4' consists of a brace rod 18 having one end connected with the front end of bar 4 by the nuts 19 and its other end connected with a part of the thresher frame by the nuts 20. By adjusting either the nuts 19 or 20 said bar 4 may be moved relatively to the cutting member so as to keep the cutting parts in firm contact to secure the shearing cut.

The apparatus with my attachment in place is driven to the shock and the sheaves are placed by the operator against the cutting member so as to sever the heads from the straw. The heads will drop onto the apron and will be carried to the threshing apparatus while the straw will remain in sheaves. Thus the straw may be easily transported to the barn or any other desired point.

My invention is also used for handling Kafir corn, milo maize and the like.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A device of the class described comprising a slide bar having extensions thereon for supporting the bar in a horizontal position when in use, a cutting element working in the slot in the bar, a chute secured to said bar for directing the severed heads as described and means for adjusting the slotted bar relative to the cutting element.

2. A device of the class described comprising a slotted bar having downwardly projecting extensions thereon for supporting the bar in horizontal position when in use, a journal carried by said bar, a rotary cutting element working in the slot and having a part mounted in the journal and deflector means for directing the heads severed by the cutting means as described.

3. A device of the class described comprising a slotted bar having downwardly projecting extensions for supporting the same in horizontal position when in use, a cutting element working in said slot, a deflector plate connected with one edge of the bar and extending downwardly at an incline below the cutting element and an inclined portion on the other edge of the bar adjacent the slotted part thereof for directing the severed heads on to the inclined portion of the plate.

In testimony whereof I affix my signature.

WILLIAM A. MORRIS.